US008677427B1

(12) United States Patent
Habib

(10) Patent No.: US 8,677,427 B1
(45) Date of Patent: *Mar. 18, 2014

(54) RECEIVING OVER-THE-AIR LICENSES TO HIGH-QUALITY MEDIA CONTENT

(75) Inventor: Ahsan Habib, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 147 days.

This patent is subject to a terminal disclaimer.

(21) Appl. No.: 13/354,433

(22) Filed: Jan. 20, 2012

Related U.S. Application Data

(63) Continuation of application No. 12/100,742, filed on Apr. 10, 2008, now Pat. No. 8,136,139.

(51) Int. Cl.
*H04N 7/173* (2011.01)

(52) U.S. Cl.
USPC .......... 725/86; 725/62; 725/81; 725/89; 725/94; 725/109; 725/110

(58) Field of Classification Search
USPC .......... 725/62, 81, 86, 89, 94, 109–110
See application file for complete search history.

(56) References Cited

U.S. PATENT DOCUMENTS

| 2007/0260604 A1* | 11/2007 | Haeuser et al. ............ 707/9 |
| 2008/0040501 A1* | 2/2008 | Harrang et al. ............ 709/232 |
| 2009/0164378 A1* | 6/2009 | West et al. ............ 705/55 |

* cited by examiner

*Primary Examiner* — Mulugeta Mengesha

(57) ABSTRACT

A method, system, and medium are provided for enabling playback of licensed media content. The depicted embodiments provide a method to enable users to play a high-quality media file on a computing device. More specifically, the method provides a method to authenticate a high-fidelity license on a computing device to enable playback of an associated high-quality media file. Illustrative examples of high-quality media files include any media file that may contain a video and/or audio component.

15 Claims, 4 Drawing Sheets

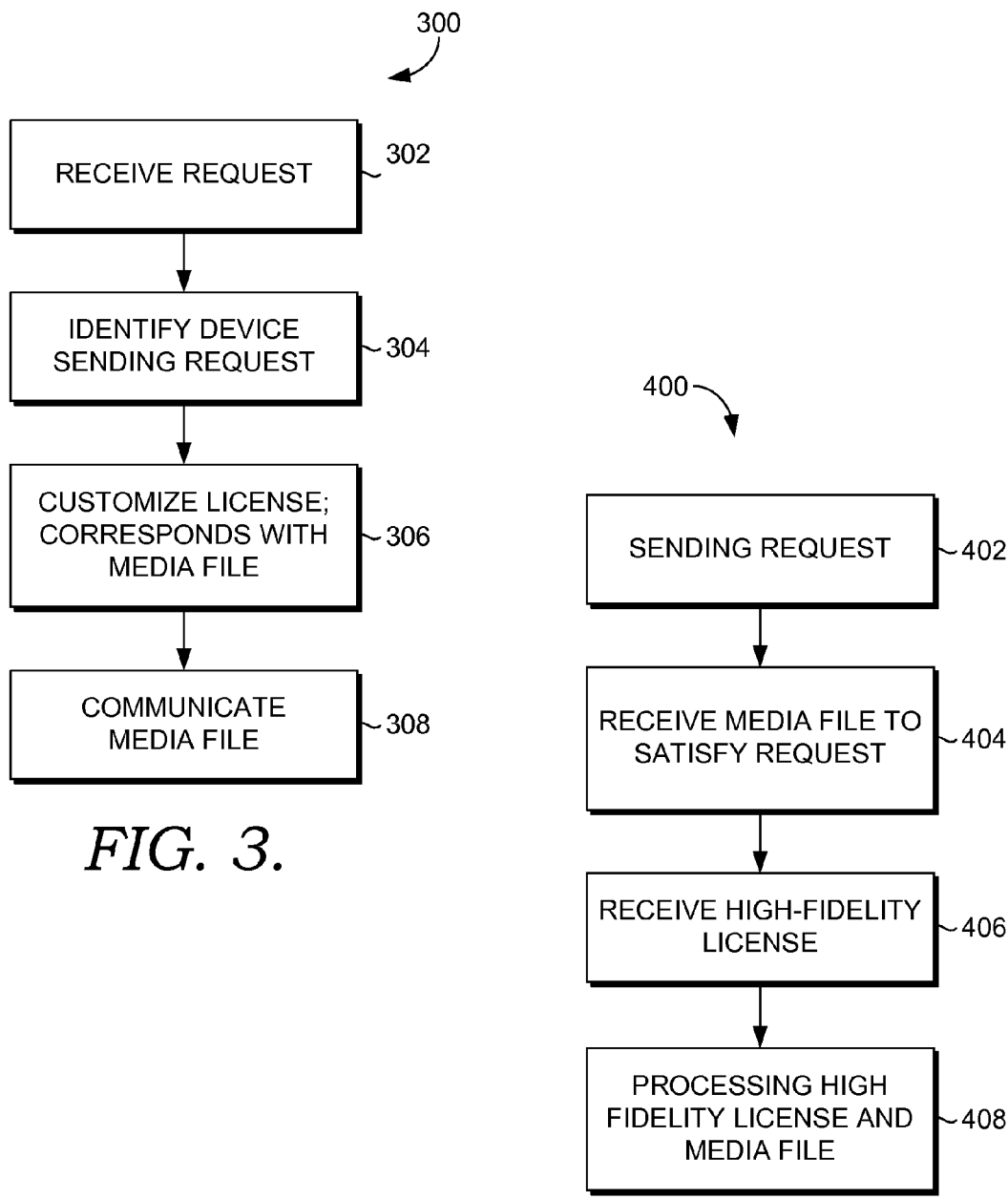

RECEIVING OVER-THE-AIR LICENSES TO HIGH-QUALITY MEDIA CONTENT

CROSS-REFERENCE TO RELATED APPLICATIONS

This application is a continuation of application Ser. No. 12/100,742, filed Apr. 10, 2008, which is incorporated in its entirety by reference herein.

SUMMARY

Embodiments of the present invention are defined by the claims below. But summarily, embodiments provide a method to enable users to play a high-quality media file on a mobile computing device. Illustrative examples of high-quality media files include any media file that may contain a protected video and/or audio component.

In a first illustrative aspect, a method to communicate licensed content over the air by way of a telecommunications network to a mobile computing device is provided. One embodiment of the method includes receiving a request for a media file from a requesting device, identifying the requesting device, creating a license that corresponds with the requested media file, and communicating the license and media file to the requesting device.

In a second illustrative aspect, a method to enable automatic playback of a high-fidelity media file on a computing device is disclosed. One embodiment includes sending a request for a media file, receiving the requested media file with a low-fidelity license and high-fidelity license, and storing the licenses and media files.

In a final illustrative aspect, a method of communicating licensed media content to a targeted device via a wireless telecommunications network to enable playback of the licensed media content is provided. One embodiment of this method includes accepting a request for a media content file from a seeking device, recognizing the seeking device in association with an account holder, creating a high-fidelity license of the media file, and storing the media file, high-fidelity license, and corresponding license. This method can also include communicating the media file, high-fidelity license, and corresponding license to the seeking device. Finally, this method also includes enabling playback of the high-quality media file by way of the high-fidelity license.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 depicts an illustrative flow diagram according to an embodiment of the present invention to communicate licenses to playback high-quality media files over the air;

FIG. 4 depicts an illustrative flow diagram according to an embodiment of the present invention to enable playback of a high-fidelity media file to a mobile computing device.

DETAILED DESCRIPTION

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and combinations are of utility and may be employed without reference to other features and combinations and are contemplated within the scope of the claims. Not all steps listed in the various figures need to be carried out in the specific order described. Moreover, although the terms "step" and/or "block" may be used herein to connote different elements of methods employed, the terms should not be interpreted as implying any particular order among or between various steps herein disclosed unless and except when the order of the individual steps is explicitly described.

As one skilled in the art will appreciate, embodiments of the present invention may be embodied as, among other things: a method or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
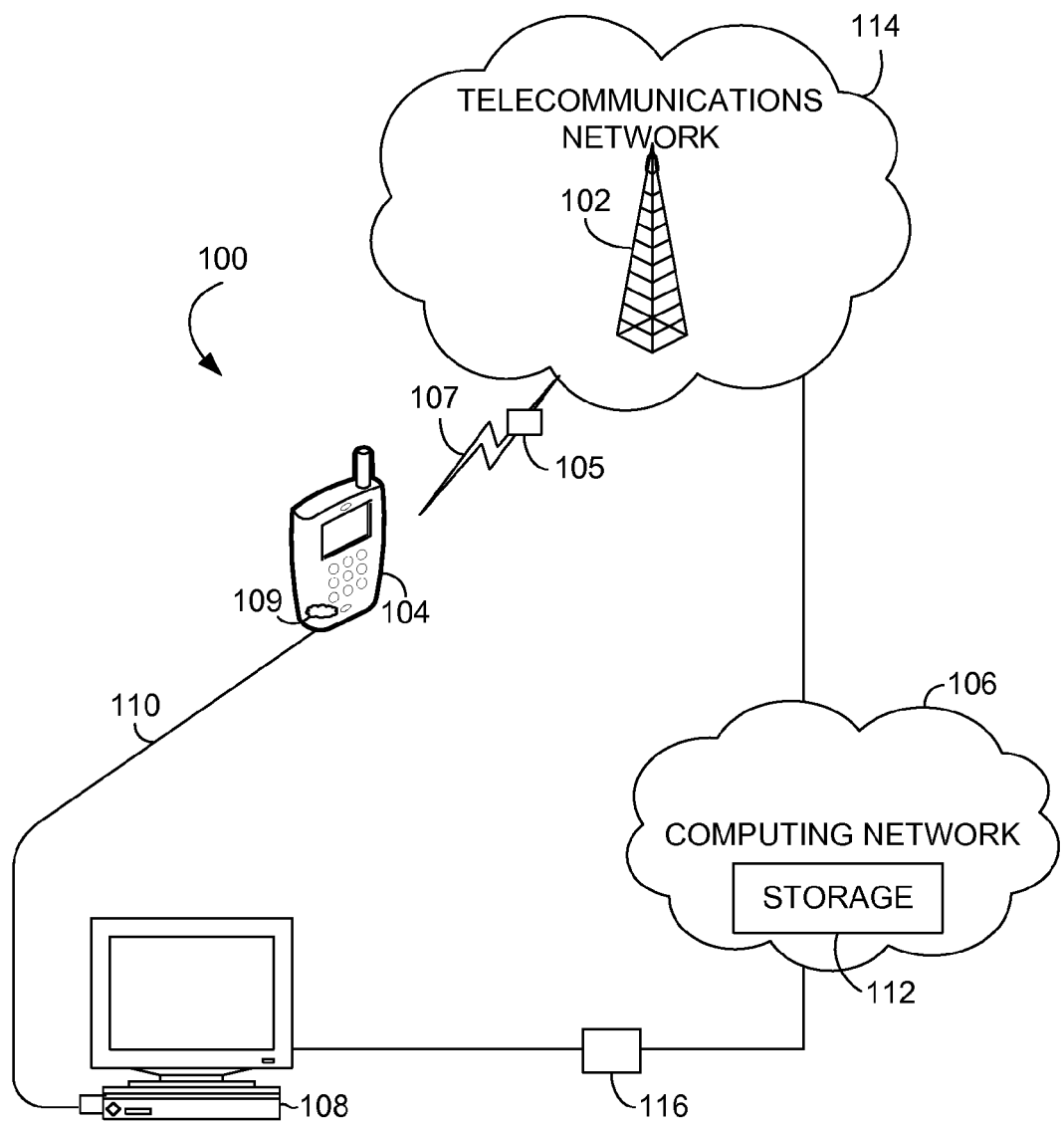
FIG. 1 illustrates an exemplary operating environment for practicing an embodiment of the present invention.

Turning now to FIG. 1, an exemplary operating environment is observed for practicing the present invention and is referenced generally by the numeral 100. It should be noted at the outset that although we show some indications that help indicate wireless links, we certainly do not intend lines to indicate non-wireless links. They show that some sort of communication pathway exists. For example, a line is shown coupling a mobile device 104 with a computer 108. But this could be by way of WiFi or Bluetooth, two illustrative wireless protocols; albeit not of the same sort of technology as wireless indicator 107 (a technology of a wireless telecommunications network, not a LAN). A mobile device 104 communicates with a computer 108 and/or telecommunications network tower 102 which in turn communicates with a computing network 106 and a storage component 112 to satisfy requests initiated by a computer 108 and/or mobile device 104.

Tower 102 provides a mobile device 104 access to a telecommunications network 114. In one embodiment, tower 102 provides wireless connectivity from the mobile device 104 to the computing network 106. In another embodiment, account holders are associated with the telecommunications network 114. A wireless telecommunications network 114 is depicted in FIG. 1 as being useable in accordance with an embodiment of the present invention. Wireless network 114 does not include networks such as a Wi-Fi network or other high-speed local-area networks. Rather, telecommunications network 114 is of the sort that can communicate data on a grand scale (e.g., country wide) and generally with a relatively low throughput, on the order of hundreds of kilobits per second, perhaps a few megabits per second (as opposed to the bandwidth of, say WiFi, which is normally on the order of 54 Mbs or so). One would not be motivated to employ the present invention in a high speed network with sufficient capacity to directly download a large media file 116 (about 3-5 MB). In such a setting, the high fidelity media file 116 would simply be downloaded directly. But in many wireless telecommunications networks, with relatively low throughput capacities, enabling downloading such a large file is not feasible, especially when so many people might call on such a service. Network 114 might service tens of millions of customers simultaneously. In such an environment, we will describe enabling a download of a license 105, which an application 109 can later pair with a separately uploaded, high-fidelity media file 116 that was downloaded by some other way (often, a high-speed way).

Embodiments of mobile device 104 may take many forms, including for example, a personal digital assistant (PDA), cell phone, or other sort of a wireless communications device that can communicate with a network of network 114's sort (e.g., a CDMA, WiMax, TDMA, GSM, GPRS, EVDO, type of network).

In one embodiment, computing network 106 (such as the internet) receives a request for a media file 116 from a computer 108 and/or mobile device 104. This computing network 106 includes an associated storage component 112. The storage component 112 might be located by way of the computing network 106, while in other embodiments the storage component 112 is located on computer 108. In some embodiments, the computing network 106 includes a server or collection of servers. Media file 116 is often an audio file, but might include video and/or an audio component.

One embodiment of the present invention includes mobile device 104 requesting over the air a desired song, for example. If authentication criteria are used and satisfied, a license 105 will be sent to mobile device 104. Later, or at the same time, a computer 108 sends a request for a high-fidelity version of the song (or whatever media file); namely media file 116, to computing network 106 (wherever the media file is stored; e.g., storage component 112). The computer 108 can be coupled with mobile device 104 to transfer media file 116 to mobile device 104. Application 109 matches license 105 to protected media file 116, enabling its playback, and preventing a need to separately load a license onto mobile device 104 (because one is already there).

It might be the case that mobile device 104 is equipped with a WiFi or similar radio. If mobile device 104 does have a WiFi radio, then it could possibly use this radio to receive media file 116. But even in this embodiment, the license is downloaded by way of wireless communications network 114, not a WiFi network.

Connection 110 is used to communicate media file 116 from a computer 108 to a mobile device 104. In some embodiments, this connection 110 is wired (e.g., USB), but in other embodiments, it is wireless of the Bluetooth or possibly WiFi sort.

In another embodiment of the present invention, a mobile device 104 requests a media file 116 by communicating with a telecommunications network system 114. The telecommunications network system 114 sends a request to an online computing network 106 (if network 114 does not satisfy the request), which includes a storage component 112. The storage component 112 stores the requested media files in one embodiment. Computer 108 accesses the storage component 112 and media files 116 through a data packet network such as the Internet to gain access to the requested media files. The mobile device 104 downloads a copy of the requested media file 116 to enable playback of this requested media file.

Figure 2:
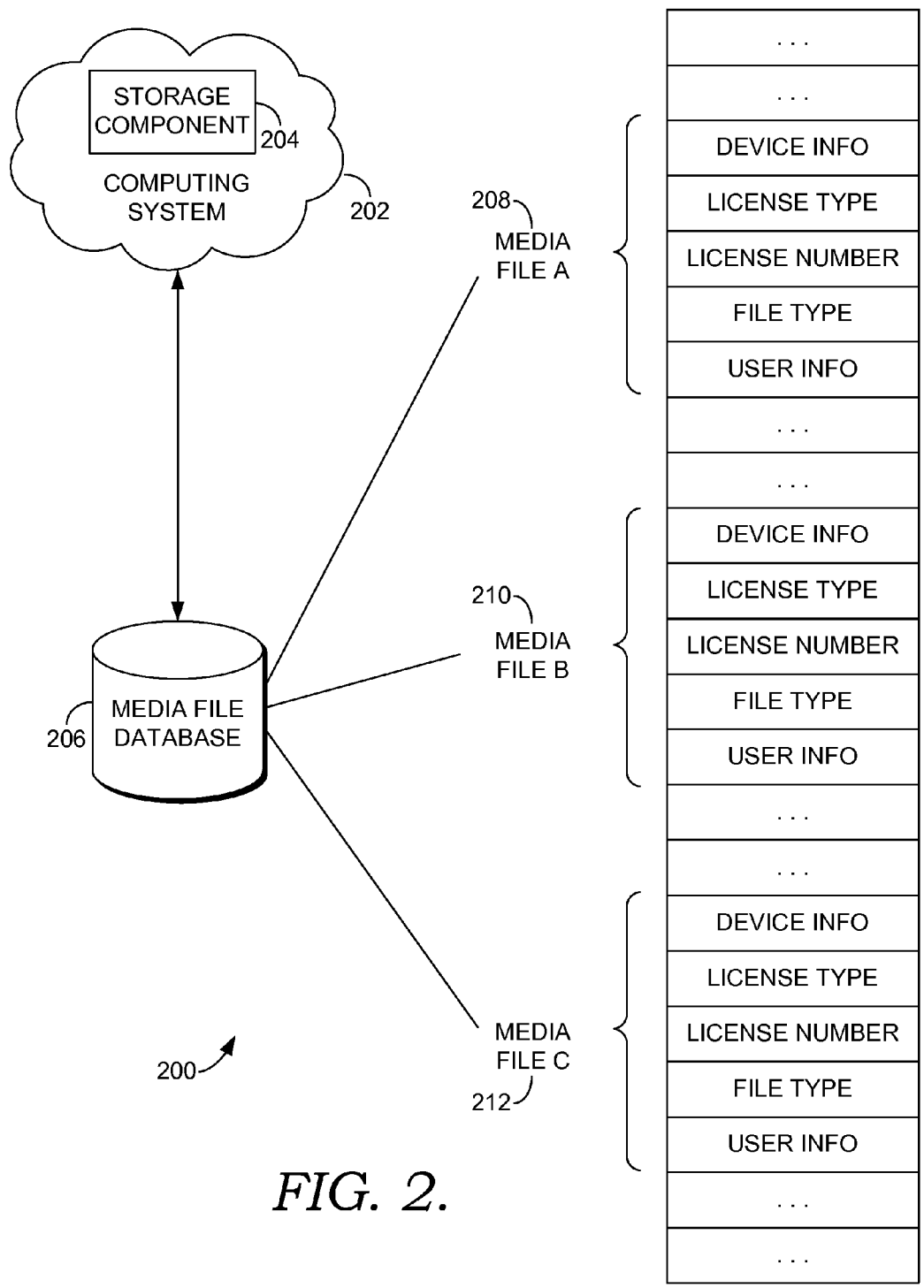
FIG. 2 illustrates a storage component media for authenticating a media file in an embodiment of the present invention.

Turning now to FIG. 2, an illustration is provided to help explain aspects of an embodiment of the present invention, and is referenced generally by the numeral 200. The figure includes a computing system 202, a storage component 204 on the computing system, and a media file database 206 to search for media files 208, 210, and 212 by searching metadata information. Another embodiment uses the metadata associated with each media file 208, 210, and 212 to authenticate a license for playback of the media files on a computer 108 and/or mobile device 104 as seen in FIG. 1. A media file may include a single media or several media files. Thus for simplification purposes, an embodiment of a singular media file is described in this application.

Computing system 202, as discussed previously, operates to receive requests for media files from a computer 108 and/or mobile device 104. In some embodiments, the computing system is a server or collection of servers. In other embodiments, the computing system has an association with a particular telecommunications network such as Telecommunications USA, Inc.

Computing system 202 includes an associated storage component 204. One embodiment of the storage component 204 includes being located on the computing network while other embodiments include the storage located in association with the computing system on a remote computer.

We are about to explain an embodiment that employs a media file database, but in some embodiments, the songs or other media files 116 are simply stored in a retrievable manner. To the extent a database helps streamline operations, we discuss an embodiment that includes one.

Media file database 206 stores media files such as media file A 208, media file B 210, and media file C 212. Although three media files are depicted in FIG. 2, the present invention should not be limited to these three instances. Rather, the media file database 206 may include a plethora of media files or a single instance of a media file. One embodiment of the present invention includes the media file database 206 located within the computing system 202 such as an online server database while other embodiments include the database in the requesting device such as a computer or mobile device. In the latter embodiment, the media file database may include being located on the requesting device and excludes the computing system component 202. The media file database 206 manages media files 208, 210, and 212 as well as the associated licenses. Management of the database includes receiving a query to search for media files, locating the media files, and storing the media files on the storage component 204.

Media files 208, 210, and 212 contain unique metadata as evidenced by device information, license type, license number, file type, user information, etc. This information may be included in header information or in a messaging format to allow a media file database 206 to search for a specified media file 208, 210, and 212. Although the depicted metadata associated with media file A 208, media file B 210, and media file C 212 includes license type, device information, license number, file type, and user information, the metadata should not be limited to just these embodiments. For example, other metadata may include a song title, video title, artist's name, etc. In this sense, each media file has its own unique metadata. As mentioned previously, media files pertain to any audio and/or video component such as a music file or video file. The license type and license number metadata may include information illustrating a high-quality license, low-quality license, number of allowed licenses, etc. The device information and user information metadata may include a unique identification for an individual mobile device 104 to determine whether a device is an associated account holder. The file type includes information regarding whether the media file is an audio file or video file.

One embodiment of the present invention includes using metadata to authenticate media file license information on a computing device. For example, a computer 108 may send a request for a specified media file and receive the media file and associated licenses from the computing system 202. The computer processes the metadata on the media file to authenticate the media file to enable playback on the computer. Other embodiments of the present invention use metadata to customize and create licenses for playback of a high-quality media file on a computer 108 and/or mobile device 104.

For example, a high-quality media file may require a specialized license and limit the number of licenses used on each device. This is completed by keeping track of license numbers and information in the metadata. A further example, includes a user not authorized to receive the media file, thus the system enabling playback of the media file searches the metadata information and once determining the user or device as unauthorized, the media file does not enable playback of the media file. Metadata may also be stored in the requesting or seeking device as data to authenticate to enable playback of the media file. For example, a computing device may store the metadata information associated with each requested media file on a coupled storage component to enable quick authorization to play the media file. In this embodiment, the playback of the media file on the computing device is considered automatic or instantaneous.

Another embodiment of the present invention includes a computer 108 as seen in FIG. 1 sending a request to a computing system 202 in FIG. 2 for a media file such as 208, 210, and 212. The media files contain metadata associated therewith to create a high-fidelity license which is stored as metadata. This information is stored on the storage component 204 to allow an account holder to access the media file. Thus when a requesting device downloads a copy of the media file, the associated metadata is stored therewith.

Turning now to FIG. 3, an illustrative flow chart method to represent an embodiment of the present invention is displayed. More specifically, FIG. 3 depicts an illustrative flow diagram to communicate licensed content over the air through a telecommunications system as referenced by the numeral 300. The method receives a request at step 302, through a telecommunications system 102 as identified in FIG. 1. Next, the method identifies the device sending the request at 304, customizes a license at step 306 to correspond with the media file, and communicates the media file and license information at step 308.

At step 302, the method begins with receiving a request from a seeking device. Embodiments of a seeking device includes a mobile device such as a Personal Digital Assistant (PDA), audio player, cell phone, or wireless telecommunications device. The receiving request includes requesting a media file from a computing system 202 as seen in FIG. 2. Additionally, the request includes a specific media file such as a protected media file which requires a specialized license to enable playback of the high-quality media file.

Step 304 identifies the requesting device, such as the PDA, etc. One embodiment may include identifying a requesting device as an account holder. For example, Telecommunications USA, Inc. utilizes Telecommunications USA communications, thus a requesting device associated with a separate telecommunications system cannot utilize the Telecommunications USA, Inc. system to request a media file. One embodiment of identifying a requesting device is through use of an electronic serial number. This embodiment utilizes a unique identifying number associated with each device to determine whether a requesting device is associated with the particular telecommunications system. Although the embodiment of using a unique identifying number is depicted, other methods include a unique identifying name or unique value. In this sense, the device is known to be unique and associated with the particular telecommunications system.

At step 306, once a computer and/or mobile device is deemed associated with the particular telecommunications system, the method creates a corresponding license. One embodiment of a corresponding license includes a high-fidelity license to enable a device to playback a high-quality version of the media file without needing to verify the license through the computing system 106. A high-fidelity license requires a specialized license to enable playback of a protected media file rather than low-fidelity license which requires no specialized licenses. For example, a Windows Media Audio (WMA) file requires a customized license and is limited to the amount of times that file can be downloaded, opposed to a Koz file, which is deemed a low-quality audio file and can be downloaded an infinite number of times.

In one embodiment of step 308, a computing system 202 as seen in FIG. 2 communicates the requested media files in low-fidelity versions and corresponding licenses to a storage component associated with the computing system. In another embodiment of step 308, the computing system communicates the requested low-fidelity version of the media file and high-quality licenses to a storage component associated with the mobile device. Communicating may also include transferring or downloading the media files and related licenses. When the present invention communicates the media files and licenses, the metadata associated therewith is also communicated. Further, the method may include processing the communicated information. For example, once a mobile device receives media files and associated licenses, a user may desire to play the media file. Thus when a user first enables the media file to play, the associated metadata with the media file is authenticated. Each request thereafter to play the media file occurs without authentication. In this sense, the playback occurs simultaneously or automatically.

Turning now to FIG. 4, still another method according to an embodiment of the present invention is provided in flow-chart form. More specifically, the figure represents the steps taken to enable automatic playback of a high-fidelity media file on a computing device as shown by the numeral 400. A computing device represents a computer 108 and/or mobile device 104 as discussed in FIG. 1. The method begins at step 402, sending a request for a media file from a computing device, receiving the requested media files in a low-fidelity version and related high-fidelity license on the computing device at steps 404 and 406. The high-fidelity license enables a high-quality playback version of the requested media file. Next, at step 408, the computing device processes the requested media file and licenses, and the method concludes.

At step 402, a computing device sends a request to a computing system such as a server or computer for a media file over a wireless network as seen in FIG. 1. As discussed in FIG. 3 at step 302, the request includes requesting a media file from a computing system 202 as seen in FIG. 2. Additionally, the request may include a specific media file such as a high-quality media file which in turn requires a specialized license to enable playback of the high-quality media file. For example a request may encompass a computing device calling for a high-quality version of the song, "Thriller" by Michael Jackson.

At step 404, the computing device receives the requested media file in a low-fidelity version. One embodiment of the present invention is a mobile device receiving a low-fidelity version of the media file through a USB standard interface from a computer. Low-fidelity as described herein includes a low-quality media file. A high-fidelity media file as described herein includes a licensed content media file, and a high-quality media file. Another difference between a high-fidelity media file and a low-fidelity media file includes a high-fidelity media file requires a customized license and limiting the number of licenses to enable playback. A low-fidelity media file requires a general license and may not limit playback.

At block 406, the computing device receives a high-fidelity license from a computing system to correspond to the previously communicated low-fidelity media file version. One embodiment of step 406 may include a user accessing a webpage with their respective account information. For example, in this embodiment, a user can access their account by signing in using a password and then choosing to receive the low-fidelity version of media files and the corresponding high-fidelity license for downloading to their respective computer. Then a mobile device can receive a copy of this media file and high-fidelity license through a USB transport protocol to enable playback on the mobile device after authentication of the associated metadata.

At block 408, the computing device processes the high-fidelity license and corresponding low-fidelity media file version to enable automatic playback of the media file on the mobile device. One embodiment may include storing a copy of the media file and high-fidelity license on a computer storage system for future use, or storing a copy to enable automatic playback on the computing device. One embodiment of this step may include once a mobile device receives a media file and associated licenses, a user may desire to play the media file. As discussed at step 310 in FIG. 3, when a user first enables the media file to play, the associated metadata with the media file is authenticated. Each request thereafter to play the media file occurs without authentication. In this sense, the playback occurs simultaneously or automatically.

Figure 5:
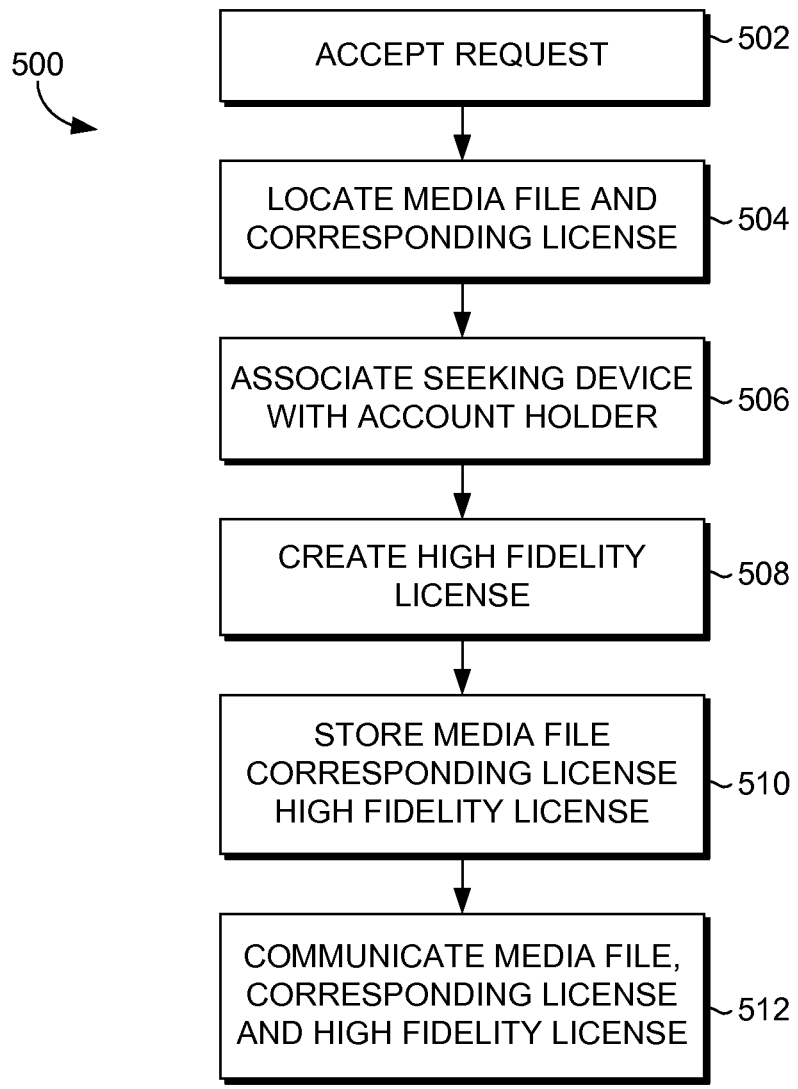
FIG. 5 depicts an illustrative flow diagram according to an embodiment of the present invention to communicate licensed media content.

Turning now to FIG. 5, yet another method according to an embodiment of the present invention is provided in flow-chart form. More specifically, the method represents the steps taken by the present invention to communicate licensed media content to a seeking device via a wireless telecommunications network to enable playback of the licensed media content on the seeking device as shown by the numeral 500. A computing system as described in FIG. 2, operates to receive requests for media files from a computer and/or mobile device. In some embodiments, the computing system may each be a server or collection of servers. Other embodiments may include the computing system having an association with a particular telecommunications network such as Telecommunications USA, Inc. The flow-chart begins at step 502 to accept a request from a seeking device, locate the media file and corresponding license at step 504, recognize the seeking device as having an association with an account holder at step 506, create a high-fidelity license at step 508, store the media file and licenses at step 510, and communicate the media file and licenses at step 512.

At step 502, a computing system accepts a request from a seeking device for a media file. As described previously, a seeking device may encompass many forms including a computer, a wireless communications device, a personal digital assistant (PDA), cell phone, mobile communications device, or other sort of mobile device capable of communicating with a telecommunications network.

At step 504, the computing system locates the media file and corresponding license within a database 206 as seen in FIG. 2. A corresponding license may include a low-quality license.

At step 506, the computing system identifies the seeking device as having an association with an account holder. One embodiment may include identifying a requesting device as an account holder. For example, Telecommunications USA, Inc. utilizes Telecommunications USA communications, thus a requesting device associated with a separate telecommunications system cannot utilize the Telecommunications USA, Inc. system to request a media file. One embodiment of identifying a requesting device is through use of an electronic serial number. This embodiment utilizes a unique identifying number associated with each device to determine whether a requesting device is associated with the particular telecommunications system. Although the embodiment of using a unique identifying number is depicted, other methods may include a unique identifying name or unique value. In this sense, the device is known to be unique and associated with the particular telecommunications system.

At step 508, the computing system creates or generates a high-fidelity license to enable the playback of a high-quality media content file based on the association with a particular account holder at step 506. For instance, if a seeking device is not deemed with an association to an account holder, the method does not create the high-fidelity license.

At step 510, the computing system stores the high-fidelity license, corresponding license, and media content file at the network location or other such storage component as a database. One embodiment may include referencing the storage component to obtain a copy of the high-fidelity license, corresponding license, and media content file. For instance, an account holder can login to an account using the Internet to obtain copies of the licenses and media content files.

At step 512, the computing system communicates the media file, corresponding license, and high-fidelity license to a computer and/or mobile device. One embodiment of this step includes a limitation on the number of times a user can download the media content file. By way of example and not of limitation, a user requesting the song "Thriller" by Michael Jackson may download this song to three associated devices such as their respective computer and two mobile devices.

The invention claimed is:

1. One or more non-transitory computer-readable media ("media") having computer-useable instructions embodied thereon that, when executed by a computing device, perform a method of communicating licensed content over the air by way of a telecommunications system, said method comprising:

receiving a request from a mobile device for a media file;
sending the request to a computing system;
forwarding a low-fidelity version of the media file from the computing system to the mobile device; and
forwarding a high-fidelity license from the computing system to the mobile device to authorize playback of a high-fidelity version of the media file on the mobile device upon downloading the high-fidelity version onto the mobile device, wherein the low-fidelity version and the high-fidelity license are stored on the mobile device.

2. The media of claim 1, wherein the high-fidelity license is downloaded to the mobile device via the telecommunications system.

3. The media of claim 1, wherein the low-fidelity version and a corresponding low-fidelity license are stored on the computing system.

4. The media of claim 1, wherein the high-fidelity version of the media file comprises a music file or a video file.

5. The media of claim 1, wherein the authorized playback is based upon an association of the mobile device with an account holder of the telecommunications system.

6. The media of claim 1, wherein the media file further comprises: metadata to customize and create the high-fidelity license for playback of the high-fidelity version of the media file.

7. The media of claim 6, wherein the metadata is stored on a storage component to allow an account holder of the telecommunications system access to the media file.

8. One or more non-transitory computer-readable media ("media") computer-useable instructions embodied thereon that, when executed by a computing device, perform a method of communicating licensed content over the air by way of a telecommunications system, said method comprising:
receiving a request and identifying metadata from a requesting device for a media content file, wherein the requesting device comprises a computing device;
communicating a low-fidelity version of the media content file to the requesting device;
communicating a high-fidelity license and customized license metadata to the requesting device for playback of a high-fidelity version of the media content file upon downloading the high-fidelity version onto the requesting device; and
enabling the requesting device to play the high-fidelity version of the media content file by authenticating the customized license metadata, wherein the computing device processes the high-fidelity license to enable playback of the high-fidelity version of the media content file, wherein each subsequent request to play the high-fidelity version of the media content file occurs automatically without authentication.

9. The media of claim 8, wherein the identifying metadata comprises unique information to identify the requesting device as an associated account holder of the telecommunications system.

10. The media of claim 8, wherein the customized license metadata is stored on the requesting device.

11. The media of claim 8, wherein the customized license metadata defines a number of allowed licenses for the requesting device.

12. The media of claim 8, wherein the playback occurs on a mobile device.

13. One or more non-transitory computer-readable media ("media") computer-useable instructions embodied thereon that, when executed by a computing device, perform a method of communicating licensed content over the air by way of a telecommunications system, said method comprising:
receiving identifying information of a requesting device in conjunction with a request for a media content file from the requesting device;
associating the requesting device with a particular account holder of the telecommunications system that has access to the media content file;
communicating a low-fidelity version of the media content file and a correlated high-fidelity license to the requesting device;
storing a high-fidelity version of the media content file and the high-fidelity license on a storage component; and
enabling access of a copy of the high-fidelity version of the media content file to the requesting device, upon downloading the high-fidelity version onto the requesting device, wherein the enabling comprises automatically locating the correlated high-fidelity license incident to receiving a subsequent request to play the high-fidelity version of the media content file.

14. The media of claim 13, wherein the enabling comprises: pairing the correlated high-fidelity license with the high-fidelity version of the media content file via an application residing on the requesting device.

15. The media of claim 13, wherein the high-fidelity version of the media content file comprises a music file or a video file.

* * * * *